March 15, 1938. P. SLOBODY 2,111,007
SELF SERVING FAUCET
Filed Aug. 12, 1936
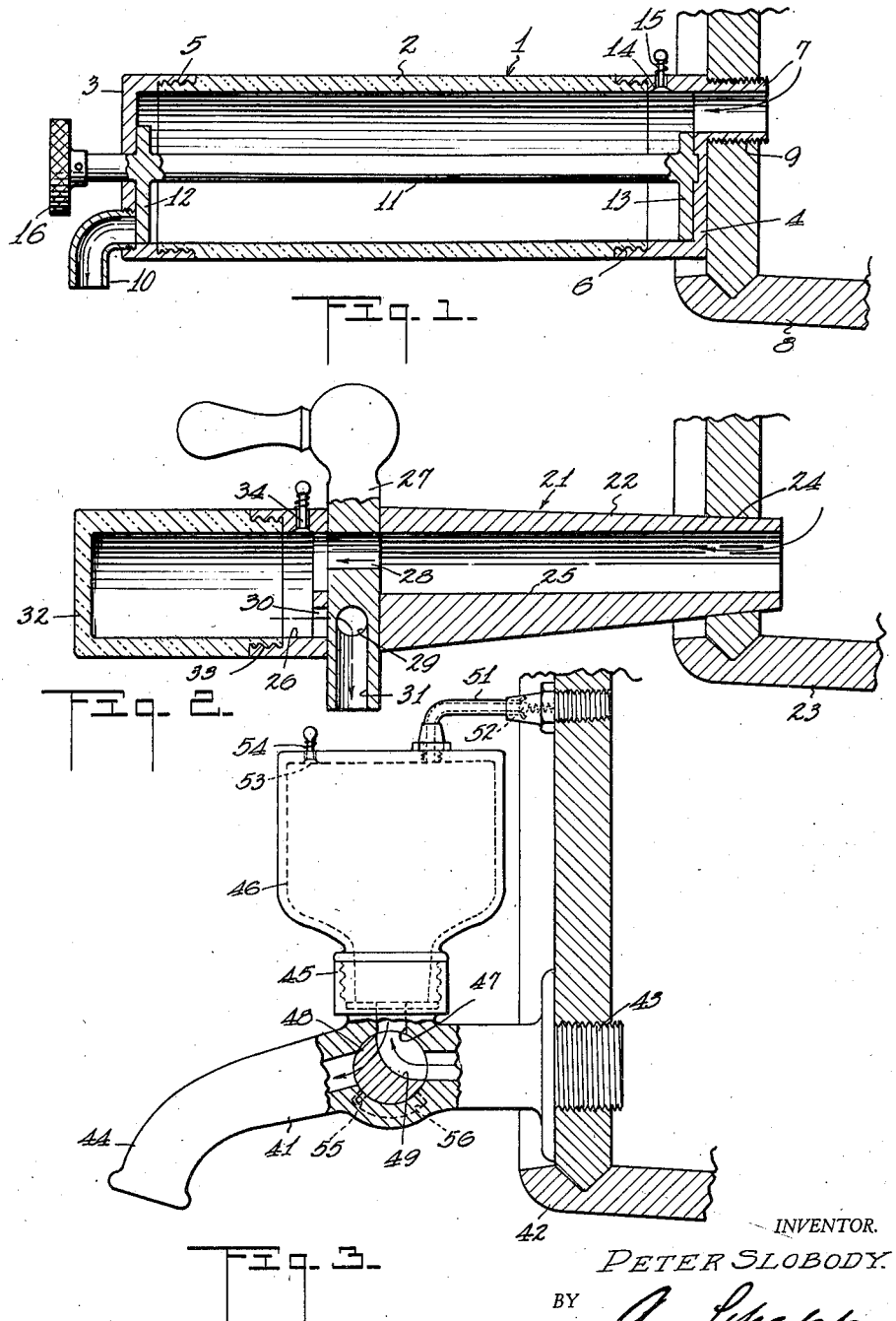
INVENTOR.
PETER SLOBODY.
BY A. Schapp
ATTORNEY.

Patented Mar. 15, 1938

2,111,007

UNITED STATES PATENT OFFICE 2,111,007

SELF-SERVING FAUCET

Peter Slobody, San Francisco, Calif.

Application August 12, 1936, Serial No. 95,546

2 Claims. (Cl. 221—116)

The present invention relates to improvements in metering faucets and its principal object is to provide a dispensing faucet for a liquid container arranged in such a manner that the liquid may be withdrawn from the faucet in measured quantities.

A further object of the invention is to provide a faucet of the character described in which a metering chamber is provided and the operating parts of the faucet are arranged in such a manner that the liquid is fed from a larger container into the metering chamber when the faucet valve is in one position and is discharged into a glass or the like held underneath the faucet when the valve is in another position.

A further object of the invention is to provide a metering faucet of the character described in which suitable means are provided for venting the metering chamber so that it may be filled completely and emptied completely in each operation to insure uniformity in the quantities of liquid dispensed each time.

A further object of the invention is to arrange the venting means in such a manner that the compressed air created during the filling operation automatically feeds back into the container containing the liquid whereby the venting may be effected without any risks of leaks through imperfect valves and without the risk of producing air pockets in the metering chamber which would interfere with the complete filling of the same.

A further object of the invention is to provide a metering chamber the wall of which is made of glass or other transparent material so that the action of the liquid as well as its color and appearance may be viewed from the outside.

A further object of the invention is to provide certain structural arrangements and improvements in a faucet of the character described by means of which the capacity of the metering chamber may be readily changed.

Further objects and advantages of my invention will appear as the specification proceeds.

The preferred forms of my invention are illustrated in the accompanying drawing in which Figure 1 shows a longitudinal vertical section through one of my metering faucets, Figure 2 a longitudinal vertical section through a modified form of my metering faucet, and Figure 3 a side elevation of a further modified form, certain portions being shown in section.

While I have shown only the preferred forms of my invention I wish to have it understood that various changes or modifications may be made within the scope of the claims hereto attached without departing from the spirit of the invention.

In the form shown in Figure 1 I provide a faucet 1 comprising a cylindrical element 2, preferably made of glass or other transparent material, and two cups 3 and 4 threaded thereon as shown at 5 and 6. The cap 4 is formed with an eccentric nipple 7 which is threaded into the barrel or other container 8 as shown at 9. It will be noted that when the faucet is in position as in Figure 1, the nipple 7 occupies its uppermost position and the top of the nipple is flush with the top of the cylindrical element 2 so that liquid may run freely from the container into the latter until it is filled to the top, all the air of the cylindrical element venting into the chamber.

The cap 3 is provided with a discharge nipple 10 which is also mounted eccentrically and diametricallly opposite the intake nipple 7. The bottom of the nipple 10 is flush with the bottom of the cylindrical element so that all the liquid may be withdrawn each time the nipple is cleared.

For controlling the intake and outlet nipples I provide a rod 11 which extends lengthwise through the faucet, preferably in central relation thereto, and is provided with two disc valves 12 and 13, one for each nipple, and arranged so that in one position the entrance nipple 7 is open and the outlet nipple 10 is closed while in another position the entrance nipple is closed and the outlet nipple open.

The cylindrical element and the end caps are dimensioned to form a metering chamber of the desired volume and it is apparent that the volume of the metering chamber may be readily changed by substitution of a cylindrical element of different dimensions for the one shown.

A valve 14 is provided to permit air to enter when the liquid is discharged from the metering chamber and this valve is normally held in closed position by a spring 15. It is opened for admission of air by suction.

In operation, when the valves 12 and 13 are in the position indicated, liquid may flow freely through the nipple 7 from the container 8 into the metering chamber while the air escapes through the same nipple into the container. The filling operation may be readily observed from the outside through the glass wall of the cylindrical element 2 and the color and appearance of the liquid, as well as the quantity present may be viewed by the customer. There is no need for changing the valve until it is desired to withdraw the liquid from the metering chamber.

For the latter operation the valves are turned, by means of the handle 16 on the rod 11 until the intake nipple is closed and the outlet nipple is open. The liquid now discharges itself into a glass or other container held under the discharge nipple and no new liquid may enter the metering chamber until the valves are again reversed. The vent valve 14 opens automatically to permit air to enter to fill the vacuum caused by the receding liquid.

In the form shown in Figure 2 the same principle is employed. The faucet 21 comprises an element 22 adapted for connection to the container 23 as shown at 24. This element which is here shown as being slightly tapered, has a bore 25 extending thereinto from one end and a larger bore 26 extending thereinto from the other end. The smaller bore connects into the larger one and is controlled by a valve 27 having a port 28 which allows liquid to pass from the smaller bore into the larger one when the valve is in the position shown in the drawing.

The valve extends clear through the element 22 and is provided with a second transverse port 29 which is made to register with a port 30 leading to the larger bore when the valve is turned through a quarter turn, in which case the bore 25 is closed but liquid may pass freely from the larger bore 26 through the ports 30 and 29 through the central downward passage 31 connecting with the latter port.

A cylindrical cup 32, preferably of glass or other transparent material, is secured to the open end of the element 22 as at 33 to cooperate with the larger bore in forming a metering chamber of desired volume. It will be noted that this construction again allows the air from the metering chamber to escape into the container 23 during the filling action because the top faces of the cup 32 and the two bores are flush with one another and horizontally alined. A valve 34 permits air to enter during the emptying operation. The volume of the metering chamber may be readily changed by substitution of a cup 32 of different length.

In the form shown in Figure 3 the conduit 41 is threaded into the container 42 as at 43 and is formed with a front portion that is bent downward as 44. Intermediate its length a superstructure is provided including an inverted cap 45 into which may be threaded the neck of an inverted bottle 46, a port 47 connecting the conduit with the bottle. A valve 48, operated by any suitable means, not shown, is formed with a groove 49 adapted to connect the port 47 either with the intake side of the conduit or with the discharge side of the latter, depending upon the position of the valve.

The top of the inverted bottle is connected, through the pipe 51, with the container 42 so as to allow the air to escape therethrough during the filling operation while a check valve 52 prevents liquid from entering the bottle during the emptying operation. A small valve 53 permits air to enter during the latter operation but is automatically closed by the spring 54 at all other times. The operation of this form of faucet is similar to that previously described.

A pin 55 projecting from the valve 48 and riding in a slot 56 of the valve housing limits the rotary motion of the valve substantially to a quarter of a turn.

I claim:

1. A faucet comprising a conduit adapted for connection to a liquid container, a metering chamber mounted thereon and communicating therewith, a double-acting valve in the conduit arranged to feed from the container into the chamber in one position and to discharge from the chamber to the outside in another position, a vent connection leading from the highest point of the chamber to the container so as to vent into the latter, and a normally closed spring-pressed valve in the vent connection separate from the double-acting valve and made to prevent back flow of liquid from the container into the chamber, the valve in the vent connection being arranged to be opened by fluid returning through the vent connection from the chamber to the container.

2. A faucet comprising a conduit adapted for connection to a liquid container, a metering chamber mounted thereon and communicating therewith, a double-acting valve in the conduit arranged to feed from the container into the chamber in one position and to discharge from the chamber to the outside in another position, a vent connection leading from the highest point of the chamber to the container so as to vent into the latter, a normally closed spring-pressed valve in the vent connection separate from the double-acting valve and made to prevent back flow of liquid from the container into the chamber, the valve in the vent connection being arranged to be opened by fluid returning through the vent connection from the chamber to the container, the metering chamber having a vent leading to the atmosphere, and a spring-pressed valve separate from the double-acting valve normally closing said vent and made for admitting air only when the chamber is discharging.

PETER SLOBODY.